US008786987B2

(12) United States Patent
Edelman et al.

(10) Patent No.: US 8,786,987 B2
(45) Date of Patent: Jul. 22, 2014

(54) BIASED TWO DIMENSIONAL MAGNETIC SENSOR

(75) Inventors: Harry Sam Edelman, Minneapolis, MN (US); Thomas Roy Boonstra, Chaska, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/458,745

(22) Filed: Apr. 27, 2012

(65) Prior Publication Data

US 2013/0286511 A1 Oct. 31, 2013

(51) Int. Cl.
G11B 5/11 (2006.01)
G11B 5/39 (2006.01)

(52) U.S. Cl.
USPC .................. 360/324.12; 360/314; 360/319

(58) Field of Classification Search
USPC ............ 360/314, 319, 324.1, 324.11, 324.12, 360/324.2, 316
See application file for complete search history.

(56) References Cited

U.S. PATENT DOCUMENTS

| | | | |
|---|---|---|---|
| 4,523,243 A * | 6/1985 | Billington | 360/327.24 |
| 6,104,562 A | 8/2000 | Otteson et al. | |
| 6,826,140 B2 | 11/2004 | Brommer et al. | |
| 7,079,359 B1 * | 7/2006 | He et al. | 360/314 |
| 7,126,890 B2 | 10/2006 | Learned et al. | |
| 7,567,397 B2 | 7/2009 | Lu | |
| 7,636,219 B2 | 12/2009 | Ikegami et al. | |
| 7,697,242 B2 * | 4/2010 | Gill | 360/314 |
| 7,813,066 B2 | 10/2010 | Nakagawa et al. | |
| 2003/0214762 A1 * | 11/2003 | Sharma et al. | 360/324.2 |
| 2005/0036437 A1 | 2/2005 | Learned et al. | |
| 2007/0019335 A1 | 1/2007 | McFadyen | |
| 2008/0144228 A1 * | 6/2008 | Funayama | 360/314 |
| 2009/0279212 A1 * | 11/2009 | Engel et al. | 360/314 |
| 2009/0279213 A1 | 11/2009 | Wu et al. | |
| 2009/0316309 A1 * | 12/2009 | Partee et al. | 360/324.2 |
| 2011/0069413 A1 * | 3/2011 | Maat et al. | 360/234.3 |
| 2011/0134572 A1 * | 6/2011 | Qiu et al. | 360/313 |

* cited by examiner

*Primary Examiner* — Jefferson Evans
(74) *Attorney, Agent, or Firm* — Hall Estill Attorneys at Law

(57) ABSTRACT

Apparatus for two dimensional reading. In accordance with some embodiments, a magnetic read element has a bias magnet disposed between a plurality of read sensors. The bias magnet may be configured to concurrently bias each read sensor to a predetermined magnetization.

20 Claims, 5 Drawing Sheets

BIASED TWO DIMENSIONAL MAGNETIC SENSOR

SUMMARY

Various embodiments of the present disclosure are generally directed to a magnetic sensor that is capable of two dimensional data sensing.

In accordance with various embodiments, a magnetic element can be constructed with a bias magnet disposed between a plurality of read sensors. While not required, the bias magnet may be configured to concurrently bias each read sensor to a predetermined magnetization.

DETAILED DESCRIPTION

Data storage industry has continually advanced towards devices with higher data capacity and data access. With such emphasis on increased performance and reduced form factors, product design has begun to experiment with the use of two dimensional magnetic recording (TDMR), which employs multiple dimension encoding of data that is subsequently decoded by reading multiple data tracks.

The use of TDMR may provide increased readback datarate with a reduced channel buffer if data from the multiple tracks is read concurrently. However, the configuration of a transducing element capable of reading multiple tracks simultaneously can have limited skew angle coverage, especially in reduced track pitch environments. Hence, industry is striving to provide a transducing element with multiple read sensors capable of concurrently reading data from multiple data tracks across a variety of skew angles.

Accordingly, a bias magnet can be disposed between a plurality of trilayer read sensors with the bias magnet configured to concurrently bias each trilayer read sensor to a default predetermined predetermined magnetization. Such position of a bias magnet between read sensors allows for compact transducer construction with the sensors close enough to simultaneously access data from multiple data tracks regardless of skew angle. Likewise, the compact design and utilization of a single bias magnet to bias multiple read sensors may be utilized for adjacent track interference cancellation while doubling readback datarate in single track data sensing.

Figure 1:
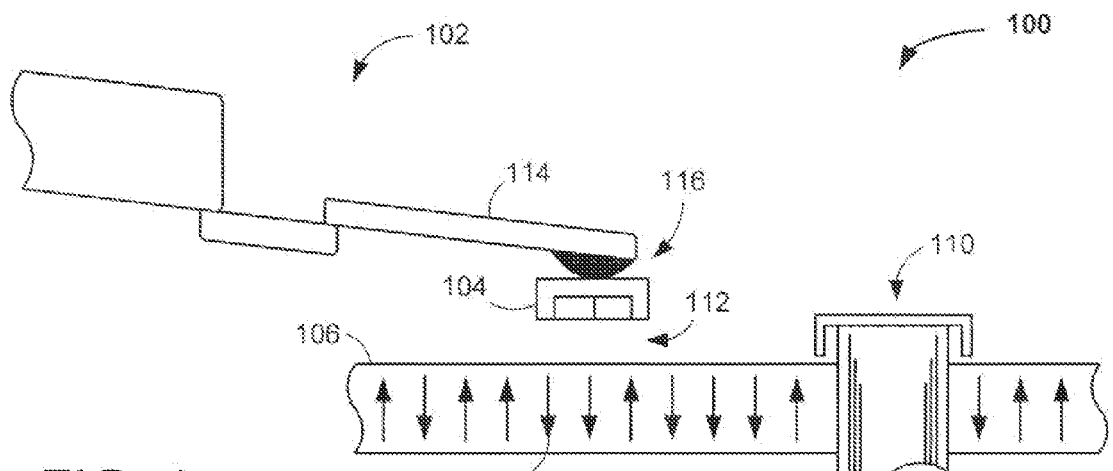
FIG. 1 is a block representation of an example portion of a data storage device.

While multiple data sensors can be utilized to read and write data in a variety of data storage environments, FIG. 1 generally illustrates an example data transducing portion 100 of a data storage device. The transducing portion 100 is shown in an environment in which various embodiments of the present invention can be advantageously practiced. It will be understood, however, that the various embodiments of this disclosure are not so limited by such environment and can be implemented to alleviate a variety of inadvertent magnetic flux generation conditions.

The transducing portion 100 has an actuating assembly 102 that positions a transducing head 104 over programmed data bits 106 present on a magnetic storage media 108. The storage media 108 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a desired portion of the media 108.

The transducing head 104 can include one or more transducing elements, such as a magnetic writer and magnetically responsive reader, which operate to program and read data from the storage media 108, respectively. In this way, controlled motion of the actuating assembly 102 induces the transducers to align with data tracks (not shown) defined on the storage media surfaces to write, read, and rewrite data.

Figure 2:
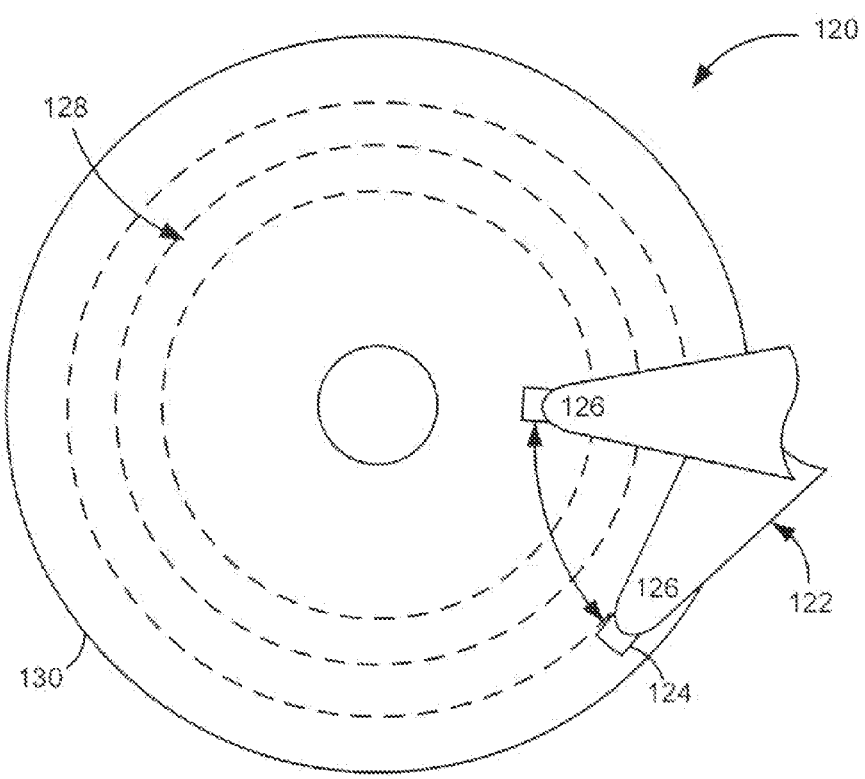
FIG. 2 provides a top view block representation of a portion of the data storage device displayed in FIG. 1.

FIG. 2 displays a top view block representation of a data transducing assembly 120 cable of being used in the data storage device of FIG. 1. An actuating portion 122 of the data transducing assembly 120 has at least a slider 124 and load beam 126 that translate to access various data tracks 128 of a data storage media 130. As shown, rotation of the actuating portion 122 modifies the angular orientation of the slider 124 in relation to the data tracks 128 in what can be called the skew angle of the portion 122.

While such angular variation may be accommodated by data processing, modern trend of increasing data bit density with decreasing track pitch, which is the width of each non-overlapping track, can position a slider 124 with multiple transducing elements in inefficient positions to read and write data as skew angle changes, especially in two dimensional magnetic recording. That is, smaller data tracks 128 combined with increased slider 124 girth due to multiple transducing elements being present can result in misalignment of the data tracks 128 and slider 124 for various skew angles. Hence, constructing a slider 124 with multiple data transducing elements as small as possible allows for use in reduced data track and form factor data storage environments with high data bit density.

Figure 3:
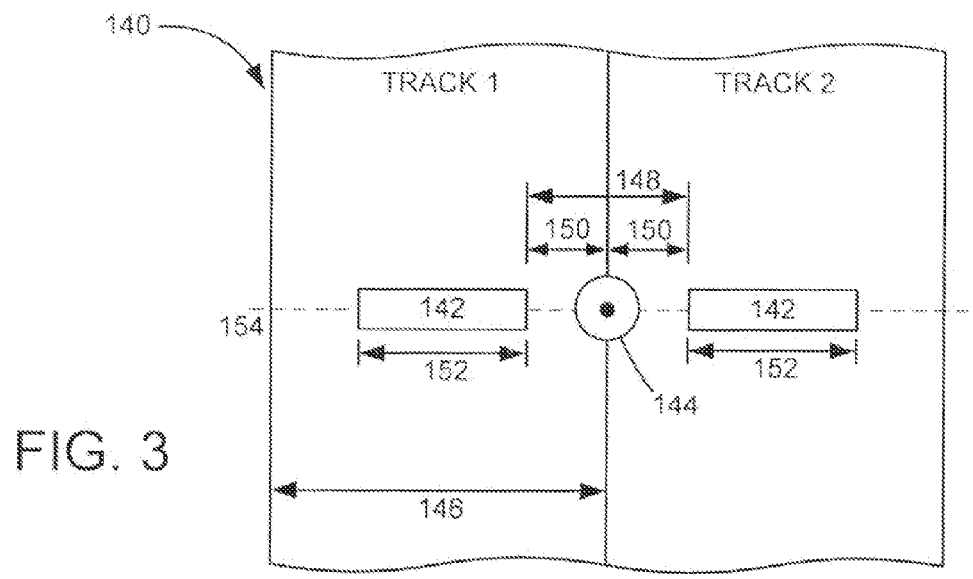
FIG. 3 shows an example block representation of a portion of a data read sensor.

FIG. 3 shows a top view block representation of a portion of a data element 140 capable of being used in the data storage device of FIG. 1 to provide two dimensional data recording. The data element 140 has a pair of read sensors 142 positioned symmetrically about a pivot point 144 that serves as the center of rotation for the data element 140. Such read sensor 142 configuration about a centralized pivot point 144 can allow for simultaneous active use of both read sensors 142 to access data bits on different data tracks regardless of skew angle.

The symmetric orientation of the read sensors 142 about the pivot point 144 can allow for a variety of non-limiting configurations to accommodate concurrent access to multiple data tracks irrespective of the data track pitch 146. However, some embodiments configure the distance 148 between the read sensors 142 as approximately half of the track pitch 146, which corresponds to distance 150 from each read sensor 142 to the pivot point 144 as approximately one quarter of the track pitch 146. Other embodiments can further configure one, or both, read sensors 142 with a longitudinal length 152 that is approximately half the track pitch 142.

Figure 4:
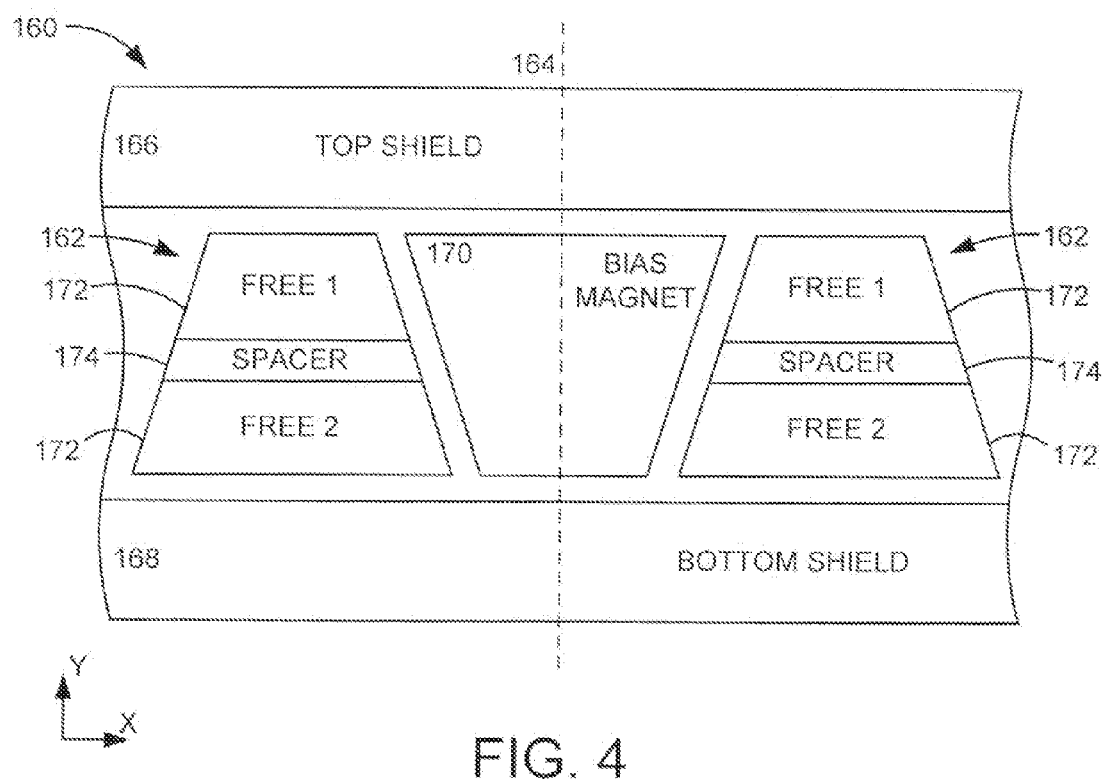
FIG. 4 displays a cross-section profile of a portion of an example read sensor constructed in accordance with various embodiments.

The read sensor 142 and pivot point 144 configuration of FIG. 4 can align multiple sensors to concurrently access multiple data tracks, with the sensors being implemented at the same lateral level of the data element 140. That is, positioning the read sensors 142 along a common axis 154 can allow for efficient construction of data element 140 with shared magnetic features, such as shields and electrical contacts.

FIG. 4 generally provides a cross-section block representation of an example data read element 160 configured with multiple in-plane read sensors 162 positioned symmetrically about a pivot point 164 and capable of conducting at least current perpendicular to plane (CPP) data sensing. The lateral alignment of the read sensors 162 provide the opportunity to use common top and bottom shields 166 and 168 that continuously provide protection to the read sensors 162 from unwanted magnetic flux while allowing simple data element 160 fabrication.

In contrast, if the read sensors 162 were offset along the Y axis, separate shielding would increase fabrication complexity plus the shield configuration may interfere with read sensor 162 magnetic vision at high skew angle, such as +/−14°. The lateral alignment of the read sensors 162 additionally allow for concurrent biasing of each sensor 162 to default predetermined magnetization with at least a single bias magnet 170 disposed between the read sensors 162. The position of the bias magnet 170 provides ample magnetization to set the read sensors 162 to respective default predetermined magnetizations due to the close proximity that would not be available if the sensors 162 were laterally or vertically offset.

While any number and type of magnetic sensors, such as tunnel magnetoresistive stacks, can be used in the data read element 160, the embodiment of FIG. 4 configures the read sensors as trilayer stacks with significantly trapezoidal shapes. Each trilayer stack is characterized by the lack of a pinned or reference magnetic structure, but instead by dual magnetically free layers 172 separated by a non-magnetic spacer 174. The trilayer stacks are respectively biased to a default predetermined magnetization that is subsequently altered with the sensing of an external data bit when the free layers 172 are either parallel or anti-parallel.

It should be noted that the configuration of the various aspects of the data read element 160 are not limited to that shown in FIG. 4. As such, the material, thickness, orientation, and shape of the various components can be modified to allow concurrent two dimensional magnetic reading of data from adjacent data tracks. One particular modification can be the manner in which electrical signals are passed through the read element 160. The presence of dual read sensors 162 along with the simultaneous reading of data from different data tracks can be difficult with common top and bottom shields 166 and 168.

Figure 5A:
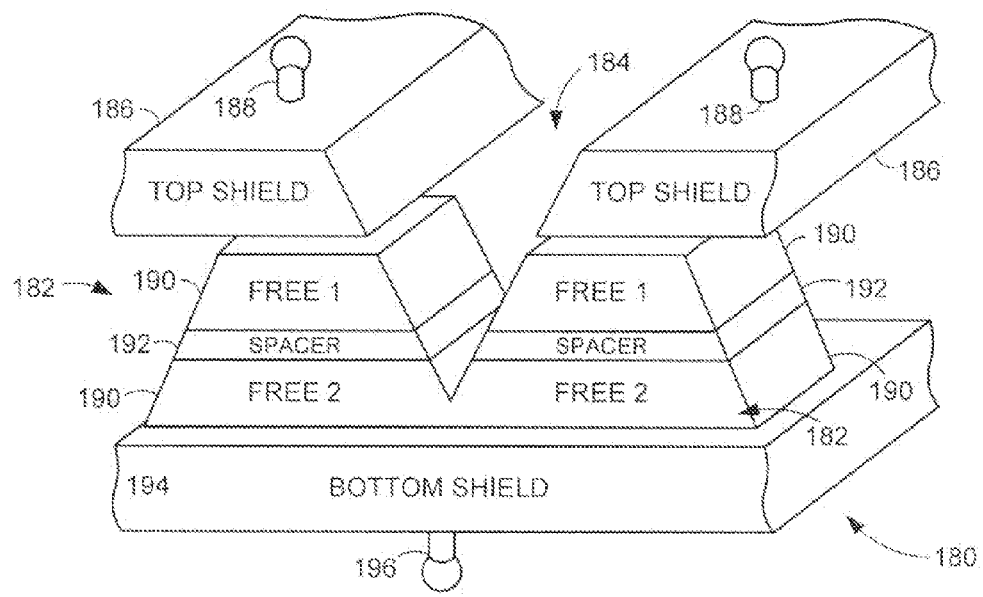
FIGS. 5A and 5B respectively illustrate isometric and top views of a portion of an example magnetic element constructed and operated in accordance with various embodiments.
Figure 5B:
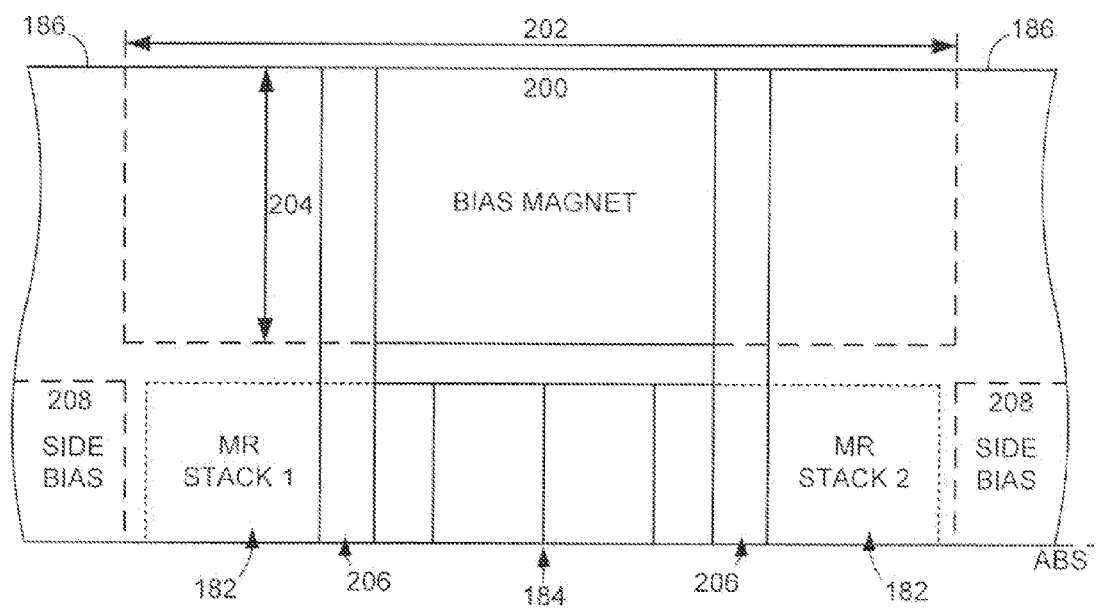

FIGS. 5A and 5B respectively show isometric and top views of a magnetic data element 180 configured in accordance with various embodiments to allow efficient two dimensional data reading for virtually any skew angle. The magnetic data element 180 generally has similar components as the embodiment shown in FIG. 4, but FIGS. 5A and 5B illustrate how efficient fabrication can produce a sophisticated two dimensional data reader.

As discussed above, common shields allow for accurate and efficient shielding, but are difficult to render data signals from different read sensors 182. Hence, an isolation trench 184 can be formed substantially between the trilayer read sensors 182 along the pivot point of the magnetic data element 180. The isolation trench 184 can extend partially or wholly through a common top shield 186 to form two electrically isolated contacts 188 that allow respective data signal processing from each trilayer read sensors 182.

The isolation trench 184 may further separate a single trilayer read stack into multiple read sensors, which facilitates efficient element fabrication as alignment and thickness matching between each trilayer read stack 132 is avoided by employing the isolation trench 184 separation means. The isolation trench 184, as displayed, may not extend through the free and spacer layers 190 and 192 of the trilayer read sensors 182 to promote diffusion of magnetization amongst the lower free layer 190.

The isolation trench 184 may in some embodiments separate the top shield 186, read sensor 182, and bottom shield 194 into multiple independent sensors joined by non-magnetic insulating material, such as alumina. However, in other embodiments, like the one shown in FIGS. 5A and 5B, the bottom shield 194 is left to continuously extend from one read sensor 182 to the other to serve as a single electrical contact 196 for the magnetic data element 180. It can be appreciated that a single bottom shield contact 196 can allow for simultaneous use of all read sensors 182 as current splits to the lop contacts 188 through the respective trilayer stacks.

FIG. 5B provides a top view of the magnetic data element 180 of FIG. 5A. With the dual read sensors 182 constructed out of a common lamination, the bias magnet 200 remains disposed between the sensors 182, but translated to the rear, opposite the air bearing surface (ABS). Placement of the bias magnet behind the read sensors 182 can allow for shape and size tuning that is not necessarily available in the same lateral plane as the read sensors 182, as illustrated by FIG. 4.

The rear portion of the magnetic data element 180, as measured along the Z axis, is open to allow the bias magnet 200 to have a bias width 202 and bias length 204 that extends tinder the respective lop shields 184 to correspond with ample magnetization to set each read sensor 182 to a predetermined default predetermined magnetization. The top view of FIG. 5B shows how the isolation trench 184 may not be orthogonal in shape, but instead angular, to produce angled shield sidewalls 206. While the sidewalls 206 may be configured to provide heighted magnetic flux protection for the read sensors 182, the introduction of corners proximal to the free layers 190 of magnetoresistive stacks can degrade spatial resolution by affecting bias magnet 200 field generation.

Accordingly, side bias magnets 208 may be positioned adjacent each trilayer, read sensor 182 on the ABS. The addition of lateral magnetization with the side bias magnets 208 can aid in magnetic stabilization and stack relaxation to the default predetermined magnetization, which can be challenging in high data bit density reduced form factor data storage environments. It should be noted that the side bias magnets 208 can be selectively included in the data element 180 depending on the configuration of the read sensors 182. That is, a trilayer reader, like that used in FIG. 5A, can be exclusively biased by a rear bias magnet 200 while a different magnetoresistive sensor uses the side bias magnets 208 individually or in combination with the rear bias magnet 200 to set a default predetermined predetermined magnetization in the sensors 182.

Figure 6:
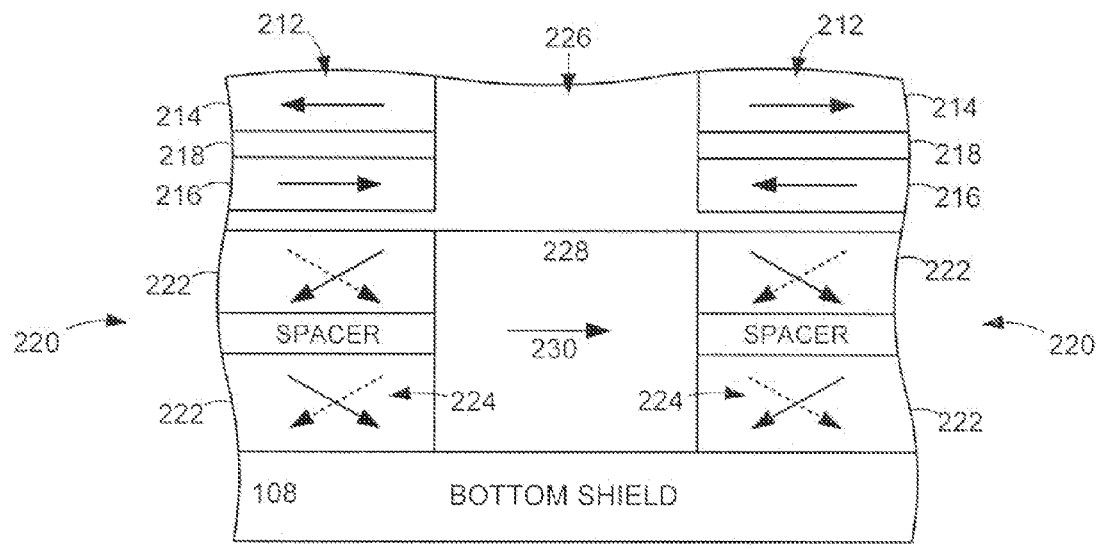
FIG. 6 displays a block cross-section representation of an example magnetic element capable of being used in the data storage device of FIG. 1.

Regardless of whether or not side bias magnets 208 are utilized, the trench sidewall 206 magnetization issues may be compensated by configuring the top shields 186 with more robust cross-track shield magnetization. FIG. 6 generally illustrates an ABS view of an example data element 210 utilizing cross-track magnetization top shields 212. Each top shield 212 is configured as a synthetic antiferromagnet SAF structure with an anti ferromagnetic layer 214 having a pinned magnetization setting a magnetically free layer 216 via exchange coupling across a spacer layer 218.

The SAF structures 212 may inadvertently influence the trilayer read sensors 220, especially when the free layers 222 of the sensors 220 have angled magnetizations 224 that are not orthogonal to the SAF magnetization directions, as displayed in FIG. 6. The isolation trench 226 is accordingly tilled with a non-magnetic material that continuously extends between the SAF shields 212 and the trilayer read sensors 220. The insulating material of the insolation trench 226 can further protect the bias magnet 228 from magnetization that could alter the direction and magnitude of the bias magnetization 230.

Figure 7:
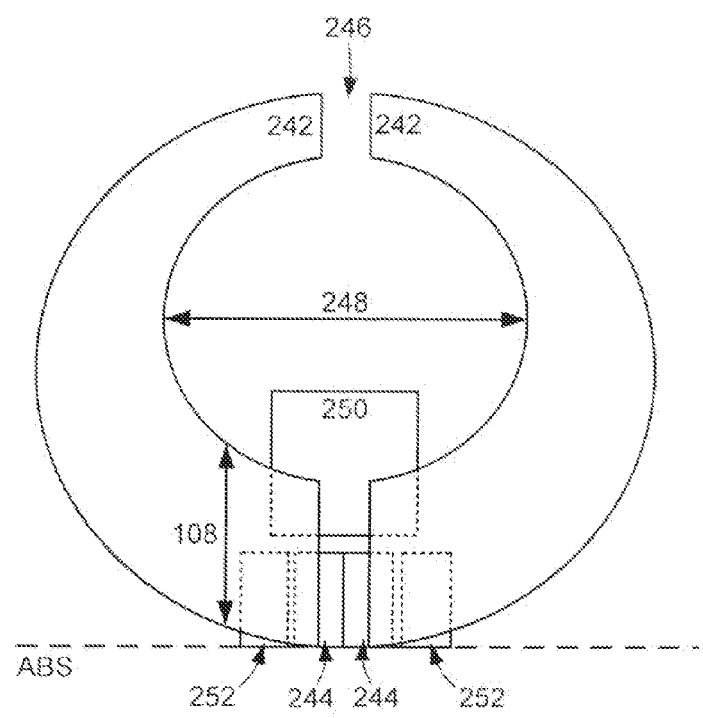
FIG. 7 provides a top view of a portion of an example magnetic element constructed in accordance with various embodiments.

FIG. 7 shows a top view of another example data element 240 employing a cross-track magnetization with a nano-shield characterized by the substantially curvilinear shape that allows shape anisotropy to increase magnetization control by preventing domain wall formation about the trench sidewalls 244 of the isolation trench 246. The circular shape of each nano-shield top shield 242 can allow for the formation of internal apertures that provide stabilization to the cross-track magnetization and allow for increased levels of shield magnetization tuning.

For example, the internal aperture could be a circle or oval that has a predetermined diameter 248 that exposes portions of the bias magnet 250 and side bias magnets 252 to localize shape anisotropy in predetermined shield widths 254 and control cross-track magnetization. In other embodiments, the internal aperture is orthogonal in shape and positioned distal to the ABS. While none of the internal aperture configurations are required or limiting, the ability to tune the top shield for cross-track magnetization can provide shields optimized for particular data storage environments, such as heat assisted magnetic recording (HAMR).

Figure 8:
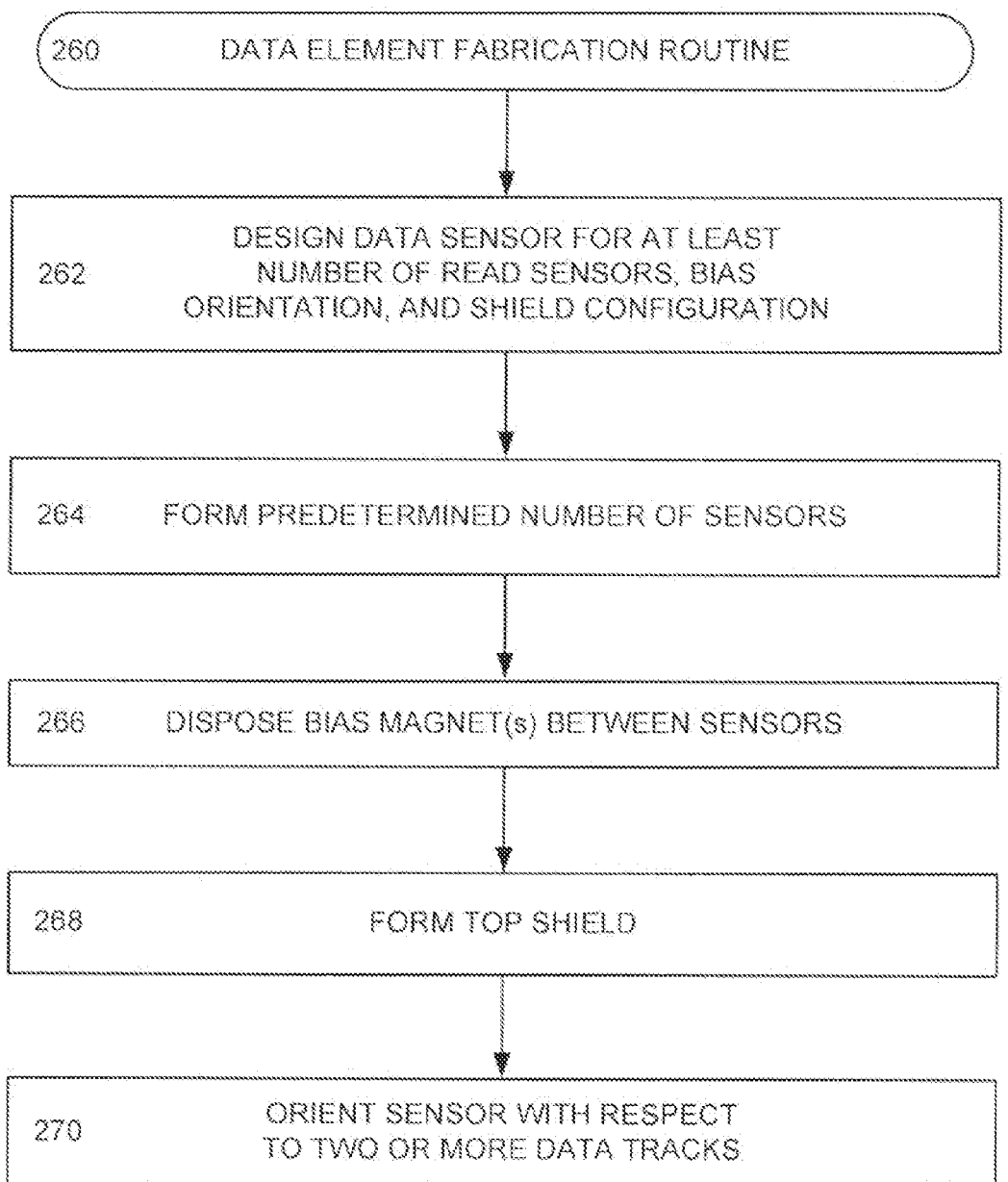
FIG. 8 is a flowchart of a read sensor fabrication routine conducted in accordance with various embodiments.

FIG. 8 provides an example data element fabrication routine 260 performed in accordance with various embodiments. The routine 260 begins by evaluating a number of non-limiting design choices regarding the structure and operation of the data element in step 262. The evaluation can include at least the number of read sensors to be built as well as the size, number, and shape of the bias magnet(s) and the top and bottom shield configurations. As displayed in FIGS. 4-7, a data element can be constructed in a variety of configurations that allow for efficient construction and accurate sensing of data bits on different data tracks regardless of skew angle.

As such, step 262 chooses data sensor configurations tuned to predetermined data storage device characteristics, such as data bit density and data transfer rates. Step 264 then forms the chosen number of data read sensors, which may be conducted as the deposition or a single trilayer lamination that is subsequently separated into individual sensors by at least one isolation trench. Various embodiments construct a single read sensor stack and then move to step 266 where a bias magnet is disposed between the read sensors distal to the air bearing surface. The design of step 262 dictates the size, shape, and position of the bias magnet as well as the presence, number, and shape of any side bias magnets.

Next, step 268 forms a top shield atop the read sensor lamination and bias magnet(s). While the top shield may be a variety of different configurations, as shown by FIGS. 6 and 7, the top shield can subsequently be cleaved by an isolation trench to provide a multitude of electrical contacts that match the number of read sensors and separate the read sensor lamination into individual sensors.

Finally in step 270, the constructed data element is mounted on a data transducing assembly so that the pivot point of the data sensors is positioned symmetrically between the read sensors, thus allowing the close proximity read sensors to be aligned with different data tracks regardless of skew angle. It can be appreciated that routine 260 can produce a data element with a wide variety of configurations tuned to concurrently read data from different data tracks. However, the routine 260 of FIG. 8 is not limiting as the various steps can be omitted, changed, and added. For example, a decision can be made of how many contacts are to be formed via the top and bottom shields, such as the three shown in FIG. 5A.

The various structural configurations of the sensors, shield, and electrical contacts of the data element described in the present disclosure allows for at least two dimensional magnetic reading and adjacent track interference cancellation due to simultaneous reading of data bits from different data tracks. Moreover, the fabrication of a bias magnet disposed between at least a pair of read sensors separated by an isolation trench allows for efficient fabrication and accurate operation due to proper sensor alignment and precise spacing between the shields, sensors, and bias magnet. In addition, while the embodiments have been directed to magnetic sensing, it will be appreciated that the claimed technology can readily be utilized in any number of other applications, such as data programming.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising:
a bias magnet disposed between a plurality of read sensors, the bias magnet configured to concurrently bias each read sensor to a predetermined magnetization, wherein each read sensor comprises a trilayer stack characterized as comprising first and second magnetically free layers separated by a non-magnetic spacer and biased to the predetermined magnetization only by the bias magnet.

2. The apparatus of claim 1, wherein the read sensors and bias magnet share top and bottom magnetic shields.

3. The apparatus of claim 2, wherein the top shield is split into sub-shields by an isolation trench proximal the bias magnet.

4. The apparatus of claim 2, wherein at least the top shield is a nano-shield.

5. The apparatus of claim 4, wherein each nano-shield is circularly shaped.

6. The apparatus of claim 4, wherein the nano-shield has a circular aperture distal to an air bearing surface of the trilayer read sensors.

7. The apparatus of claim 1, wherein each trilayer stack is further characterized by a lack of a reference layer pinned to a fixed magnetic orientation.

8. The apparatus of claim 1, wherein the plurality of read sensors is electrically accessed with only three electrical leads.

9. The apparatus of claim 1, wherein each read sensor and the bias magnet are positioned on an air bearing surface.

10. A magnetic read element comprising:
a plurality of read sensors formed on an air bearing surface (ABS) by an isolation trench dissecting a plurality of layers; and
a bias magnet disposed between the plurality of read sensors, distal the ABS, the bias magnet configured to concurrently bias each read sensor to a predetermined magnetization, wherein the isolation trench dissects a top magnetic shield that extends adjacent each of the plurality of read sensors.

11. The magnetic read element of claim 10, wherein the isolation trench dissects less than all the layers of the plurality of read sensors.

12. The magnetic read element of claim 10, wherein the plurality of read sensors are characterized as trilayer read sensors formed from a single continuous read sensor.

13. The magnetic read element of claim 10, wherein each of the plurality of read sensors is positioned to simultaneously access user data from adjacent data tracks on an adjacent data storage media.

14. The magnetic read element of claim 13, wherein the simultaneous access to user data is used in two-dimensional data reading.

15. A transducing head comprising:
first and second read sensors;
a bias magnet positioned on an air bearing surface (ABS) and configured to concurrently bias the first and second read sensors to a predetermined magnetization; and
a permanent magnet positioned distal the ABS and between the first and second read sensors.

16. The transducing head of claim 15, wherein the permanent magnet is characterized as a first permanent magnet, and wherein the transducing head further comprises a second permanent magnet is positioned on the ABS adjacent the second read sensor and distal the first read sensor, the bias magnet and the first permanent magnet.

17. An apparatus comprising:
first and second read sensors;
a bias magnet configured to concurrently bias each of the first and second read sensors to a predetermined magnetization; and
top and bottom magnetic shields respectively adjacent the first and second read sensors and the bias magnet, wherein the top and bottom magnetic shields each continuously extend from the first read sensor to the second read sensor, and wherein the top shield is split into sub-shields by an isolation trench proximal the bias magnet.

18. The apparatus of claim 17, wherein at least a selected one of the top or bottom shields is a nano-shield.

19. The apparatus of claim 17, wherein at least a selected one of the top or bottom shields is a synthetic antiferromagnetic lamination.

20. The apparatus of claim 17, wherein the bias magnet is positioned on an air bearing surface (ABS), and the apparatus further comprises a permanent magnet positioned distal the ABS and between the first and second trilayer read sensors.

* * * * *

UNITED STATES PATENT AND TRADEMARK OFFICE
CERTIFICATE OF CORRECTION

| | | |
|---|---|---|
| PATENT NO. | : 8,786,987 B2 | Page 1 of 1 |
| APPLICATION NO. | : 13/458745 | |
| DATED | : July 22, 2014 | |
| INVENTOR(S) | : Harry Sam Edelman and Thomas Roy Boonstra | |

It is certified that error appears in the above-identified patent and that said Letters Patent is hereby corrected as shown below:

In the Claims

Col. 8, Line 6, Claim 16
delete "is"

Signed and Sealed this
Thirty-first Day of March, 2015

Michelle K. Lee
*Director of the United States Patent and Trademark Office*